(12) United States Patent
Anderson et al.

(10) Patent No.: US 11,884,364 B2
(45) Date of Patent: Jan. 30, 2024

(54) REAR DERAILLEUR WITH ONE-PIECE CHAIN CAGE

(71) Applicant: The Cycle Group, Anaheim, CA (US)

(72) Inventors: Kenneth K. Anderson, Irvine, CA (US); Jonathan Ziegler, Wofford Heights, CA (US)

(73) Assignee: The Cycle Group, Anaheim, CA (US)

( * ) Notice: Subject to any disclaimer, the term of this patent is extended or adjusted under 35 U.S.C. 154(b) by 62 days.

(21) Appl. No.: 17/523,819

(22) Filed: Nov. 10, 2021

(65) Prior Publication Data

US 2023/0147911 A1    May 11, 2023

(51) Int. Cl.
 *B62M 9/126*  (2010.01)
 *B62M 9/1242* (2010.01)

(52) U.S. Cl.
 CPC .......... *B62M 9/126* (2013.01); *B62M 9/1242* (2013.01)

(58) Field of Classification Search
 CPC ................ B62M 9/126; B62M 9/1242; B62M 2009/12406
 USPC .......................................................... 474/82
 See application file for complete search history.

(56) References Cited

U.S. PATENT DOCUMENTS

| | | | | |
|---|---|---|---|---|
| 3,710,636 | A | * | 1/1973 | Ozaki ..................... B62M 9/126 474/82 |
| 4,226,131 | A | * | 10/1980 | Yamasaki .............. B62M 9/126 474/134 |
| 4,406,643 | A |   | 9/1983 | Shimano |
| 4,637,808 | A | * | 1/1987 | Nakamura ............. B62M 9/126 474/80 |
| 5,624,334 | A |   | 4/1997 | Lumpkin |
| 5,860,880 | A |   | 1/1999 | Oka |
| 5,924,946 | A |   | 7/1999 | Calendrille, Jr. |
| RE36,830 | E |   | 8/2000 | Lumpkin |
| 6,135,904 | A |   | 10/2000 | Guthrie |
| 6,135,905 | A |   | 10/2000 | Soon |
| D452,664 | S |   | 1/2002 | Terasawa |
| 6,416,434 | B1 |   | 1/2002 | Calendrille |

(Continued)

OTHER PUBLICATIONS

Hopp Carbon Mech Plate Inner Cage SL For Sram Eagle 12s Rear Derailleurs AXS, XX1, X01, GX Tuning, 2023, Dream Bikes, pp. 1-12 (Year: 2023).*

(Continued)

*Primary Examiner* — Gene O Crawford
*Assistant Examiner* — Emily R Kincaid
(74) *Attorney, Agent, or Firm* — Matthew J. Spark; Stefan J. Kirchanski; Zuber Lawler LLP

(57) ABSTRACT

A rear derailleur assembly for mounting to a bicycle having a frame. The rear derailleur assembly includes an upper body portion configured to operationally engage the rear derailleur assembly to the frame, a controller portion pivotally connected to the upper body, a lower body portion pivotally connected to the upper body and pivotally connected to the controller portion, and a chain cage assembly. The chain cage assembly includes at least two pulleys configured to engage a chain of the bicycle, and a one-piece chain cage configured to retain each pulley at a particular fixed position. Each pulley is rotatable relative to the one-piece chain cage at the particular fixed position of the pulley. The lower body portion is operationally connected to the one-piece chain cage and configured to allow the one-piece chain cage to pivot relative to the lower body portion.

18 Claims, 8 Drawing Sheets

(56) References Cited

U.S. PATENT DOCUMENTS

| | | | |
|---|---|---|---|
| D534,102 S | 12/2006 | Arakawa | |
| D536,282 S | 2/2007 | Masui | |
| D551,131 S | 9/2007 | Arakawa | |
| D555,547 S | 11/2007 | Tokumoto | |
| D581,321 S | 11/2008 | Pang | |
| D617,690 S | 6/2010 | Takumoto | |
| 8,202,182 B2 | 6/2012 | Ishikawa et al. | |
| 8,852,041 B2 | 10/2014 | Yamaguchi et al. | |
| 8,870,692 B2 | 10/2014 | Yamaguchi et al. | |
| 8,870,693 B2 | 10/2014 | Shahana | |
| 8,882,618 B2 | 11/2014 | Yamaguchi | |
| 8,900,078 B2 | 12/2014 | Yamaguchi et al. | |
| 8,974,331 B2 | 3/2015 | Yamaguchi et al. | |
| 9,005,059 B2 | 4/2015 | Suyama et al. | |
| 9,187,149 B2 | 11/2015 | Yamaguchi | |
| 9,227,696 B2 | 1/2016 | Yamaguchi | |
| 9,228,643 B2 | 1/2016 | Yamaguchi et al. | |
| 9,303,763 B2 | 4/2016 | Yamaguchi et al. | |
| 9,327,786 B2 | 5/2016 | Cranston et al. | |
| 9,377,089 B2 | 6/2016 | Yamaguchi | |
| 9,463,846 B1 | 10/2016 | Chang | |
| 9,475,547 B2 | 10/2016 | Jordan | |
| 9,669,900 B2 | 6/2017 | Shirai | |
| 9,845,134 B2 | 12/2017 | Takachi | |
| 10,086,904 B2 | 10/2018 | Lin | |
| 10,189,542 B2 | 1/2019 | Wu et al. | |
| 10,351,208 B2 | 7/2019 | Yamaguchi | |
| 10,435,110 B2 | 10/2019 | Calendrille | |
| 10,435,111 B2 | 10/2019 | Shipman et al. | |
| 10,577,053 B2 | 3/2020 | Brown et al. | |
| 2003/0083162 A1* | 5/2003 | Tsai | B62M 9/1242 474/82 |
| 2007/0219029 A1 | 9/2007 | Turner | |
| 2008/0096706 A1 | 4/2008 | Watari | |
| 2008/0194363 A1* | 8/2008 | Kunisawa | B62M 9/126 474/82 |
| 2009/0054183 A1 | 2/2009 | Takachi et al. | |
| 2009/0291789 A1 | 11/2009 | Shikawa et al. | |
| 2012/0083371 A1 | 4/2012 | Yamaguchi et al. | |
| 2013/0203532 A1 | 8/2013 | Jordan | |
| 2014/0371013 A1 | 12/2014 | Yamaguchi | |
| 2016/0046352 A1 | 2/2016 | Shipman et al. | |
| 2016/0176478 A1 | 6/2016 | Chang | |
| 2016/0304160 A9 | 10/2016 | Chang | |
| 2017/0113760 A1 | 4/2017 | Lin et al. | |
| 2017/0174289 A1 | 6/2017 | Wu et al. | |
| 2018/0281899 A1* | 10/2018 | Bernardele | B62M 9/124 |

OTHER PUBLICATIONS www.disraeligears.co.uk; "Derailleurs 'A' to 'R'"; Disraeli Gears: A Derailleur Collection; URL <https://www.disraeligears.co.uk/site/derailleur_brands_a_to_r.html>; screen capture downloaded Nov. 3, 2021.

www.disraeligears.co.uk; "Derailleur Brands Beginning with 'S'"; Disraeli Gears: A Derailleur Collection; URL <https://www.disraeligears.co.uk/site/derailleur_brands_beginning_with_s.html>; screen capture downloaded Nov. 3, 2021.

www.disraeligears.co.uk; "Derailleurs 'T' to 'Z'"; Disraeli Gears: A Derailleur Collection, URL <https://www.disraeligears.co.uk/site/derailleur_brands_t_to_z.html>; screen capture downloaded Nov. 3, 2021.

* cited by examiner

REAR DERAILLEUR WITH ONE-PIECE CHAIN CAGE

FIELD OF THE INVENTION

The present invention generally relates to bicycle derailleurs. More particularly, the present invention is directed to a rear derailleur chain cage.

BACKGROUND OF THE INVENTION

Bicycles have been used for recreation, transportation, and sporting competition for decades, and can be found in all types of environments (e.g., urban, suburban, and rural). What started out as a relatively simple assembly of components has evolved into more complex forms as bicycles have been adapted from general use (e.g., transportation, exercise) to more specific niches (e.g., Olympic-style track racing, BMX-style racing, cross-country cycling, etc.).

As bicycle use has changed, the cycling industry has adapted and improved various components of the bicycle in order to meet the evolving needs of the cycling public. A bicycle rear derailleur is one such component. The purpose of a rear derailleur is to assist in changing the speed of a bicycle by selectively moving a bicycle chain between gears of a gear cassette located near a rear wheel of the bicycle. A typical rear derailleur has a base member connected to the bicycle near the rear wheel, a chain cage (also referred to as a derailleur cage or a chain guide) engaging the bicycle chain, and a movable member connecting the base member and the chain cage so as to move the chain cage laterally relative to the base member. Movement of the chain cage moves the bicycle chain between the gears of the gear cassette. A rider is able to shift gears due to a shift control device (or shifter) mounted on or near the bicycle's handlebar. One end of a control cable running down the length of the bicycle is connected to the shift control device and the other end of the control cable is connected the rear derailleur. The shift control device adjusts the amount of tension on the control cable. The shift control device allows the rider to pull (increase tension) or release (decrease tension) the control cable. An increase or decrease in tension on the control cable determines the direction on the gear cassette in which the bicycle chain moves (i.e., from lower gear to higher gear or from higher gear to lower gear). Increasing tension on the control cable causes the chain cage to laterally move in one direction relative to the base member (which, in turn, moves the bicycle chain in that same direction), while releasing tension on the control cable causes the chain cage to laterally move in another direction relative to the base member (generally the opposite direction the chain cage moves in when tension is increased). Thus, the chain cage (and bicycle chain) can be moved laterally by increasing or decreasing tension on the control cable.

A chain cage serves three functions: to "take up" extra slack on the bicycle chain; to maintain tension on the bicycle chain; and to provide the position of the bicycle chain to whichever gear on the gear cassette the user selects. Different types of chain cages have been proposed to address those functions. Conventional chain cages are put together from several individual components that include two individual, spaced-apart plates that are retained together using fasteners that serve as axles for the two pulleys (i.e., gear cogs that hold the bicycle chain in a certain position). That is, the two individual spaced-apart plates that surround the two pulleys (a guide pulley and an idler pulley) are typically secured together using fasteners that go directly through the centers of the bearings of the two pulleys (i.e., the two individual spaced-apart plates are attached to each other via the "axles" of the two pulleys).

"Shift time" is the time it takes for a gear change on the gear cassette to occur (i.e., the time it takes to switch gears on the gear cassette). It is important that the chain cage be stiff as any flex of the chain cage will provide poor shifting performance. The chain cage flexes from the perpendicular force required to push the bicycle chain from one gear on the cassette to the next gear on the cassette. If the chain cage flexes, the guide pulley requires more time to position the bicycle chain over the desired gear of the cassette, and the "shift time" is increased. With conventional multi-piece chain cages, the two individual plates can be made thicker to provide higher stiffness, but at the cost of adding weight to the chain cage.

Stiffness is also affected by how much surface area the two pulleys engage the plates with when fastened. This surface area engagement "ties" in both sides of the chain cage and allows the stiffness to be a function of both plates. However, the surface areas on the plates engaged by the pulleys is limited to the surface area on the plates engaged by the bearing surfaces of the pulleys.

Another issue with conventional chain cages is that they are commonly made of aluminum or even steel. Metals, although inexpensive, do not provide much resistance to impact before they bend. A conventional chain cage hangs low and close to the ground while in operation. This makes the chain cage susceptible to impacts on rocks and other objects which, in turn, can result in damage to the chain cage that increases "shift time."

As discussed above, conventional chain cages have their limitations and can always be improved.

Accordingly, there is a need for an improved chain cage. There is a further need for a one-piece chain cage. There is also a need for a chain cage that can mitigate the effects of various conditions and hazards that can impact engagement of the bicycle chain and the rear derailleur. There is a further need for a chain cage that provides improved stiffness, and reduced flex. There is a need for a chain cage that improves "shift time." There is an additional need for a chain cage that is easier to manufacture, assemble, adjust, and maintain. The present invention satisfies these needs and provides other related advantages.

SUMMARY OF THE INVENTION

An embodiment of the present invention provides an improved chain cage that can "take up" extra slack on the bicycle chain; maintain tension on the bicycle chain; and provide the position of the bicycle chain to whichever gear on a gear cassette the user selects. An embodiment of the present invention provides an improved chain cage in the form of a one-piece chain cage. An embodiment of the present invention provides an improved chain cage that can mitigate the effects of various conditions and hazards that can impact engagement of the bicycle chain and the rear derailleur is provided. An embodiment of the present invention provides a chain cage with improved stiffness, and reduced flex. An embodiment of the present invention provides a chain cage that improves "shift time." An embodiment of the present invention provides an improved chain cage that is easier to manufacture, assemble, adjust, and maintain.

In an embodiment of the present invention, a rear derailleur assembly (for mounting to a bicycle having a frame) includes an upper body portion configured to operationally engage the rear derailleur assembly to the frame, a controller portion pivotally connected to the upper body, a lower body portion pivotally connected to the upper body and pivotally connected to the controller portion, and a chain cage assembly. The chain cage assembly includes at least two pulleys configured to engage a chain of the bicycle, and a one-piece chain cage configured to retain each pulley at a particular fixed position. Each pulley is rotatable relative to the one-piece chain cage at the particular fixed position of the pulley. The lower body portion is operationally connected to the one-piece chain cage and configured to allow the one-piece chain cage to pivot relative to the lower body portion.

In another embodiment of the present invention, the one-piece chain cage includes a pair of spaced apart, parallel cage layers connected by at least one bridge. The cage layers and bridge are of single-piece construction.

In yet another embodiment of the present invention, each cage layer includes a number of apertures.

In still another embodiment of the present invention, the one-piece chain cage is formed from a thermoplastic composite material.

In another embodiment of the present invention, each cage layer includes at least one hollow in the cage layer.

In an embodiment of the present invention, a chain cage assembly for a rear derailleur of a bicycle having a frame and a chain, at least two pulleys configured to engage a chain of the bicycle, and a one-piece chain cage configured to retain each pulley at a particular fixed position. Each pulley is rotatable relative to the one-piece chain cage at the particular fixed position of the pulley.

In another embodiment of the present invention, the one-piece chain cage includes a pair of spaced apart, parallel cage layers connected by at least one bridge. The cage layers and bridge are of single-piece construction.

In yet another embodiment of the present invention, each cage layer includes a number of apertures.

In still another embodiment of the present invention, the one-piece chain cage is formed from a thermoplastic composite material.

In another embodiment of the present invention, each cage layer includes at least one hollow in the cage layer.

In an embodiment of the present invention, a chain cage for a rear derailleur of a bicycle having a frame and a chain, includes a one-piece chain cage that includes a pair of spaced apart, parallel cage layers connected by at least one bridge. The cage layers and bridge are of single-piece construction.

In yet another embodiment of the present invention, each cage layer includes a number of apertures.

In still another embodiment of the present invention, the one-piece chain cage is formed from a thermoplastic composite material.

In another embodiment of the present invention, each cage layer includes at least one hollow in the cage layer.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The various present embodiments now will be discussed in detail with an emphasis on highlighting the advantageous features with reference to the drawings of various embodiments. The illustrated embodiments are intended to illustrate, but not to limit the invention. These drawings include the following figures, in which like numerals indicate like parts.

DETAILED DESCRIPTION OF THE INVENTION

Figure 1:
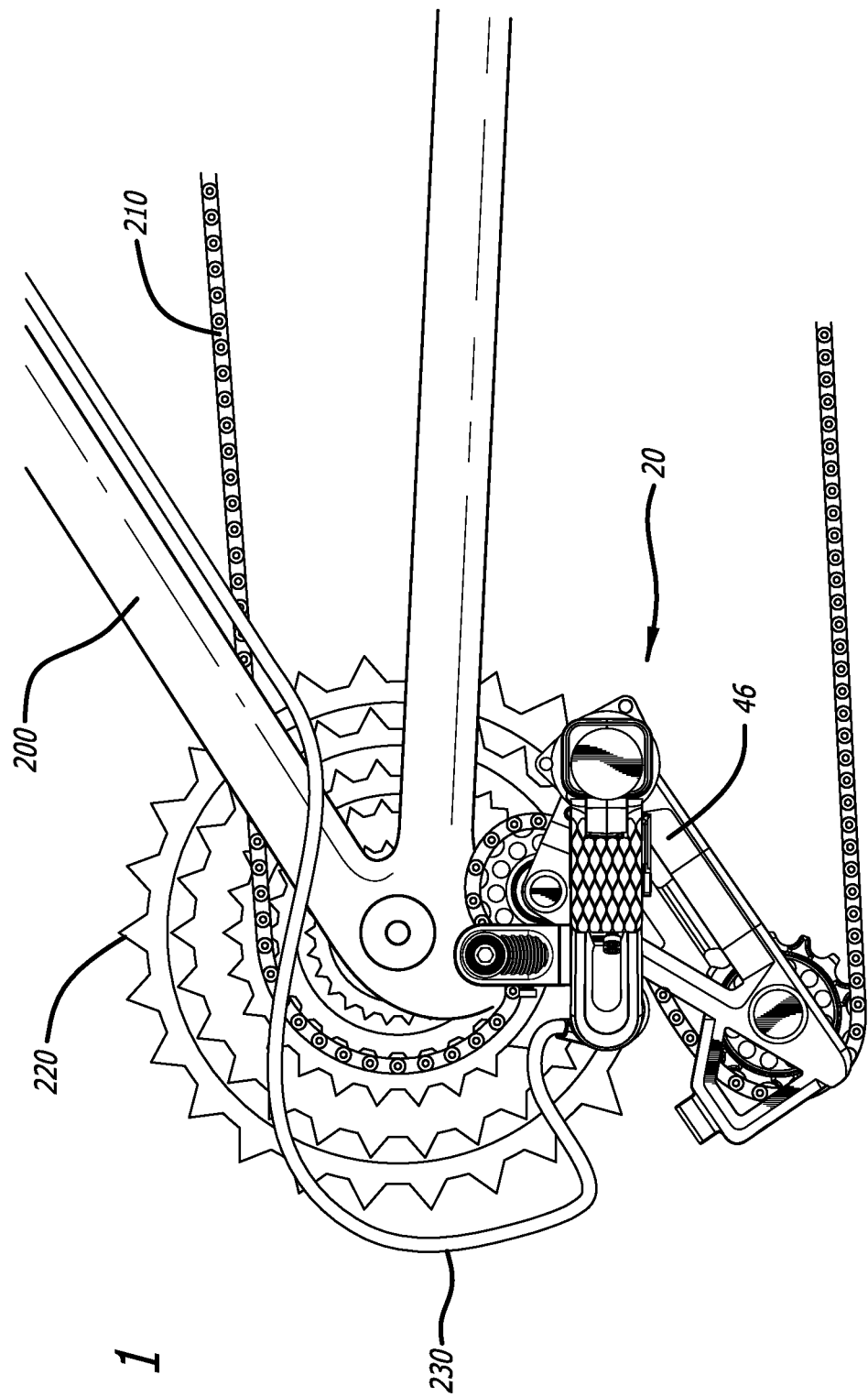
FIG. 1 illustrates a view of a rear derailleur assembly with a one-piece chain cage, in accordance with an embodiment of the present invention, engaging a bicycle frame, near a rear axle of the bicycle frame.

The following detailed description describes the present embodiments, with reference to the accompanying drawings. In the drawings, reference numbers label elements of the present embodiments. These reference numbers are reproduced below in connection with the discussion of the corresponding drawing features.

It is to be understood that the figures and descriptions of the present invention have been simplified to illustrate elements that are relevant for a clear understanding of the present invention, while eliminating, for the purpose of clarity, many other elements found in rear derailleurs. Those of ordinary skill in the pertinent arts may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the pertinent arts.

Figure 2:
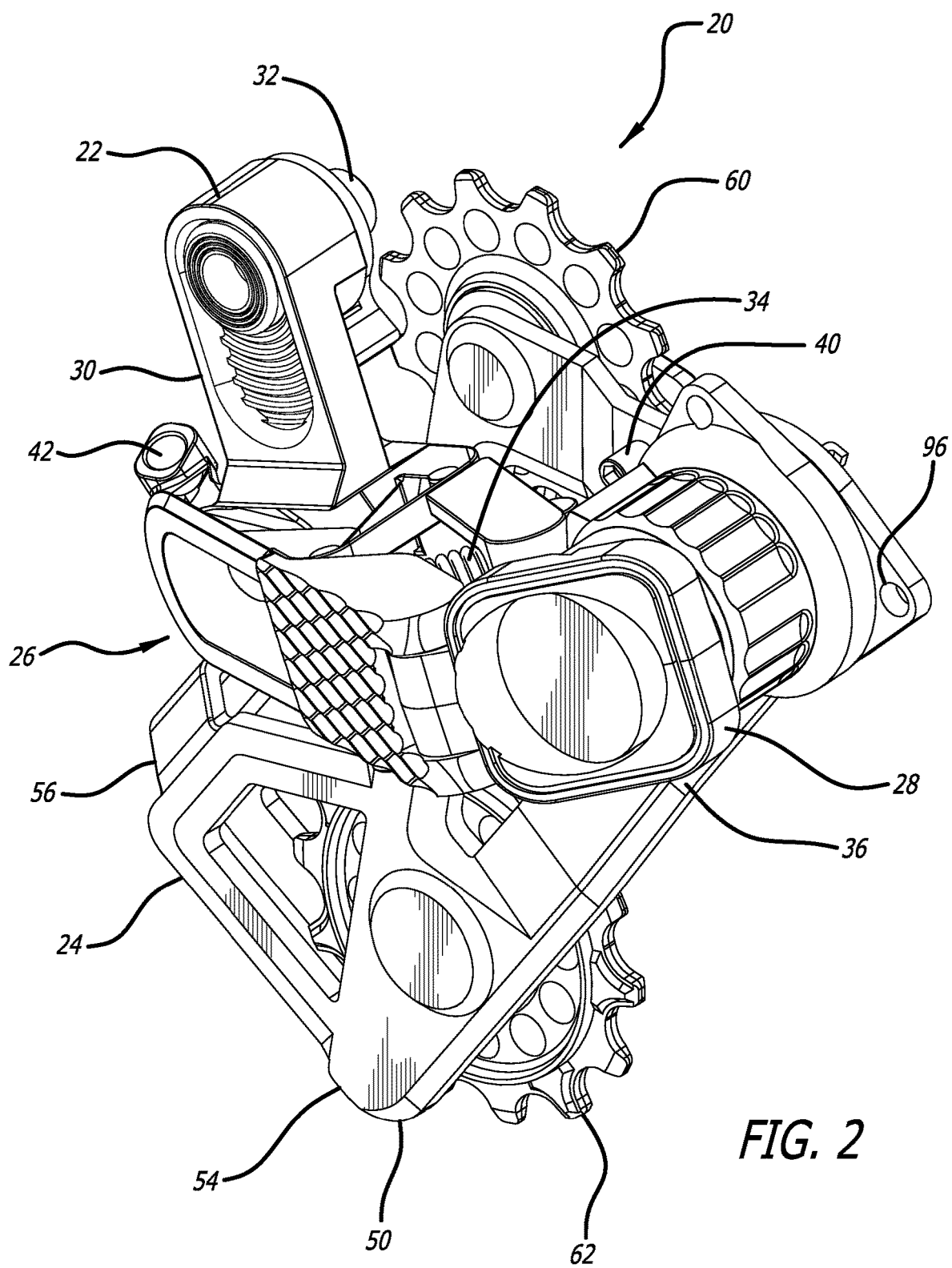
FIG. 2 is a top, front perspective view of a rear derailleur with the one-piece chain cage.
Figure 3:
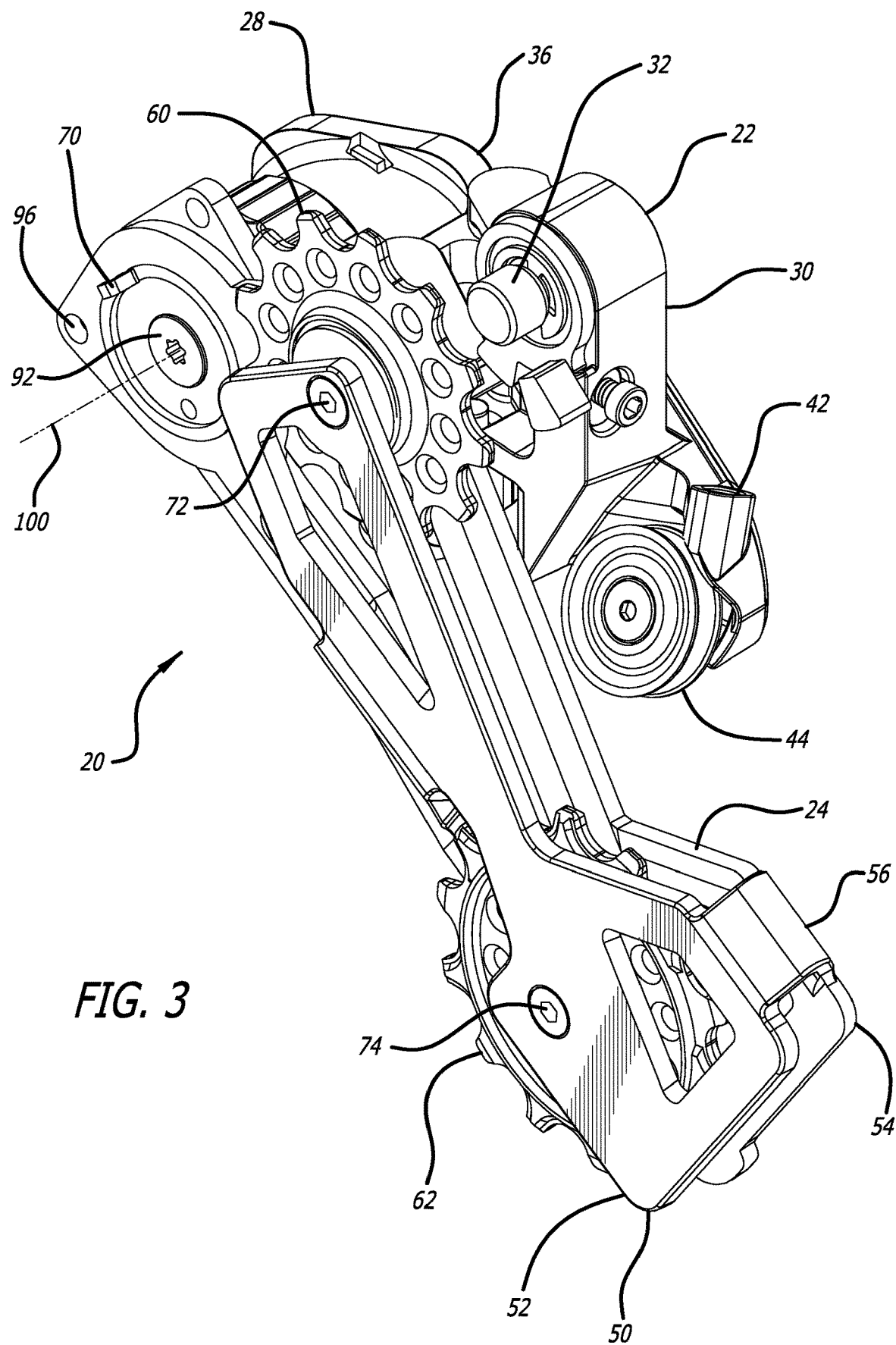
FIG. 3 is a top, rear perspective view of the rear derailleur with the one-piece chain cage of FIG. 1.
Figure 4:
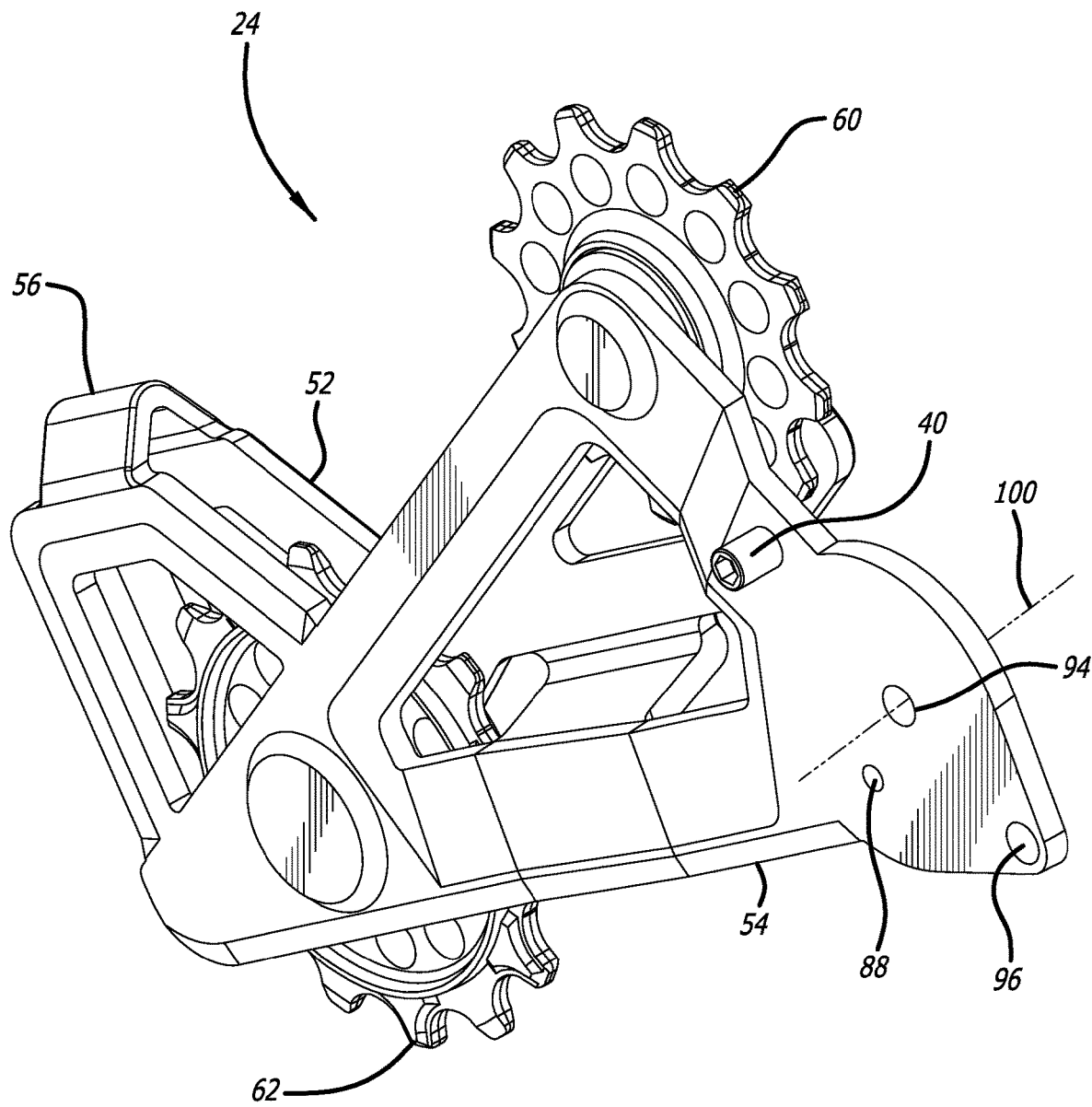
FIG. 4 is a top, front perspective view of a chain cage assembly.
Figure 5:
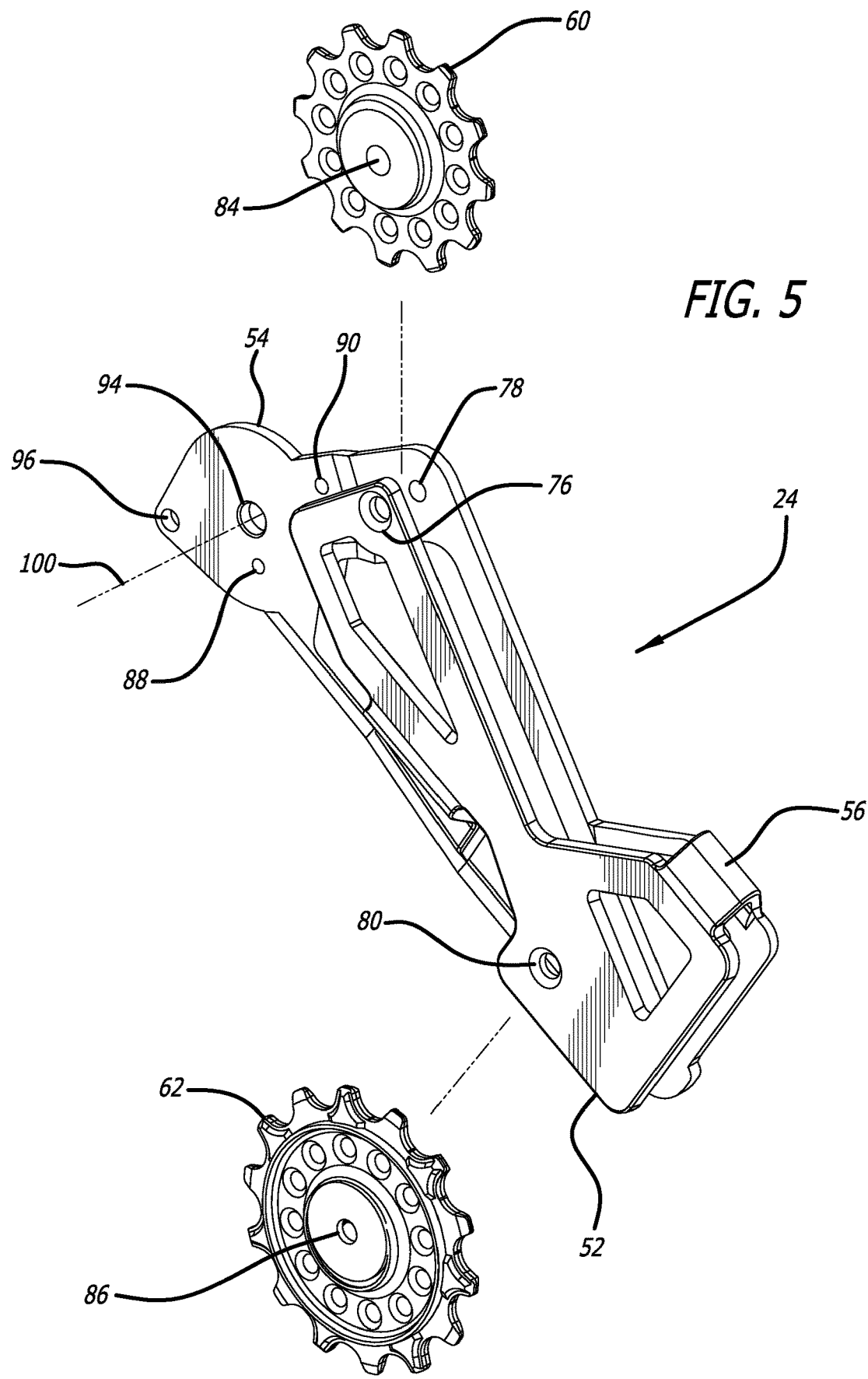
FIG. 5 is a top, rear perspective exploded view of the chain cage assembly of FIG. 4.
Figure 6:
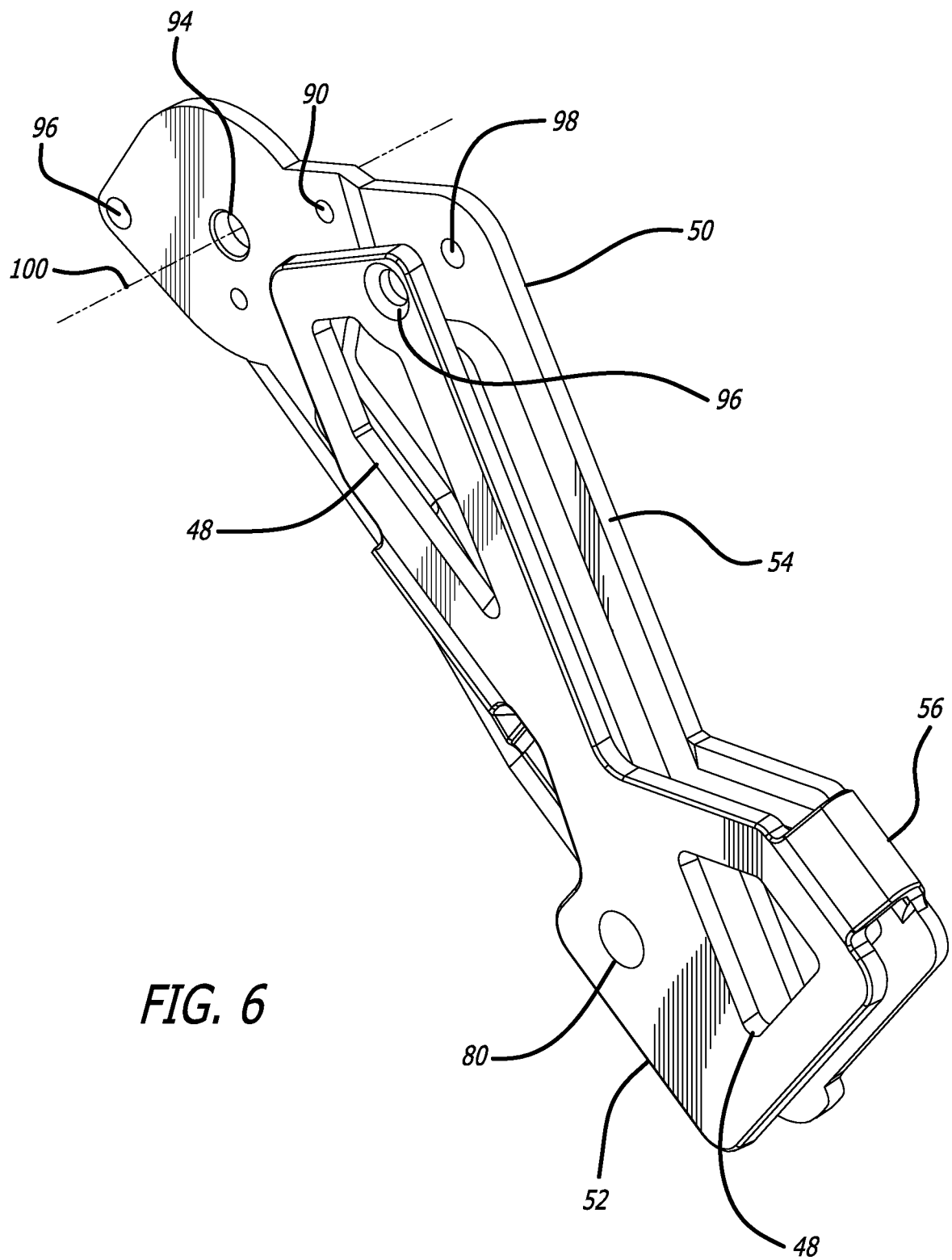
FIG. 6 is a top, rear perspective view of the one-piece chain cage of FIG. 5.
Figure 7:
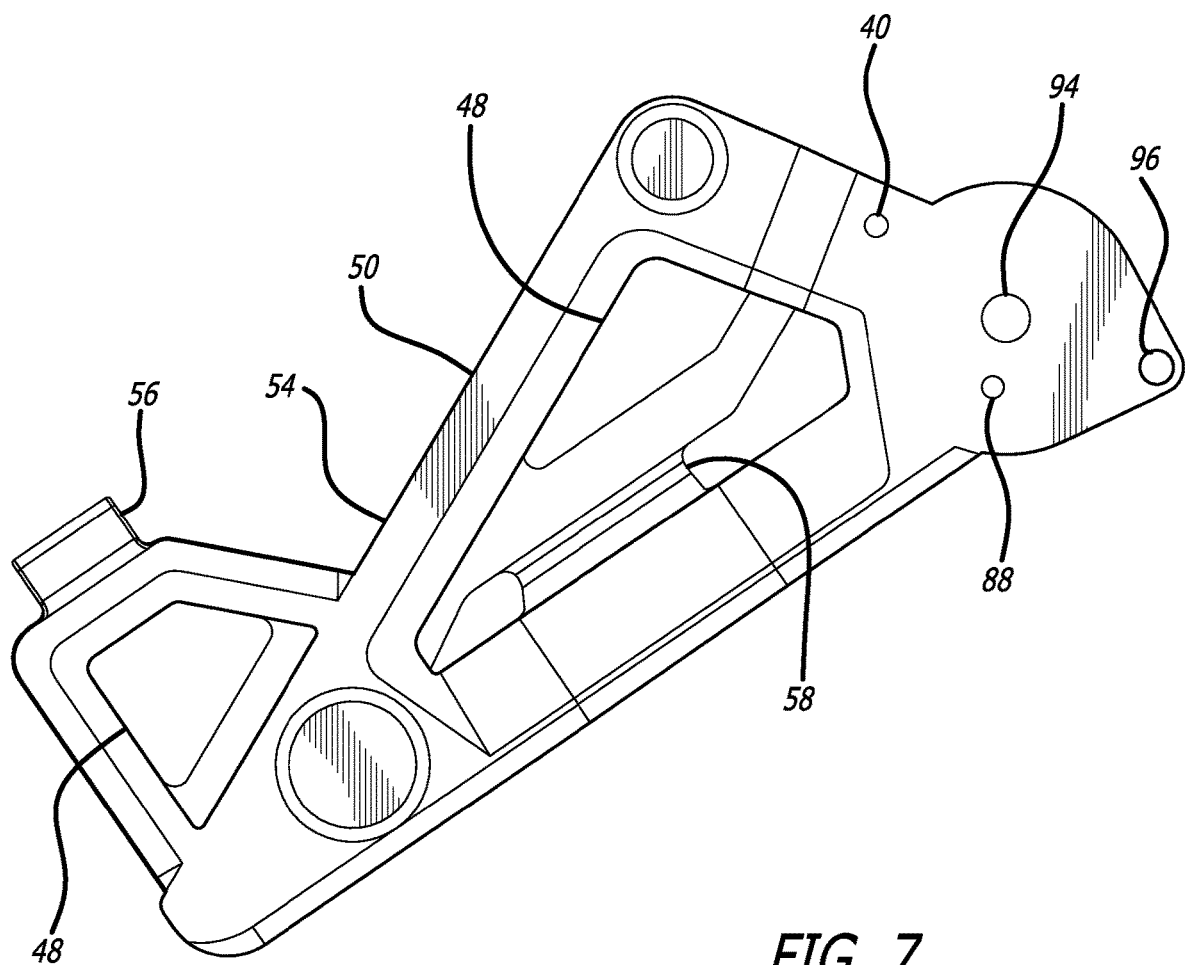
FIG. 7 is a left side elevation view of the one-piece chain cage of FIG. 6.
Figure 8:
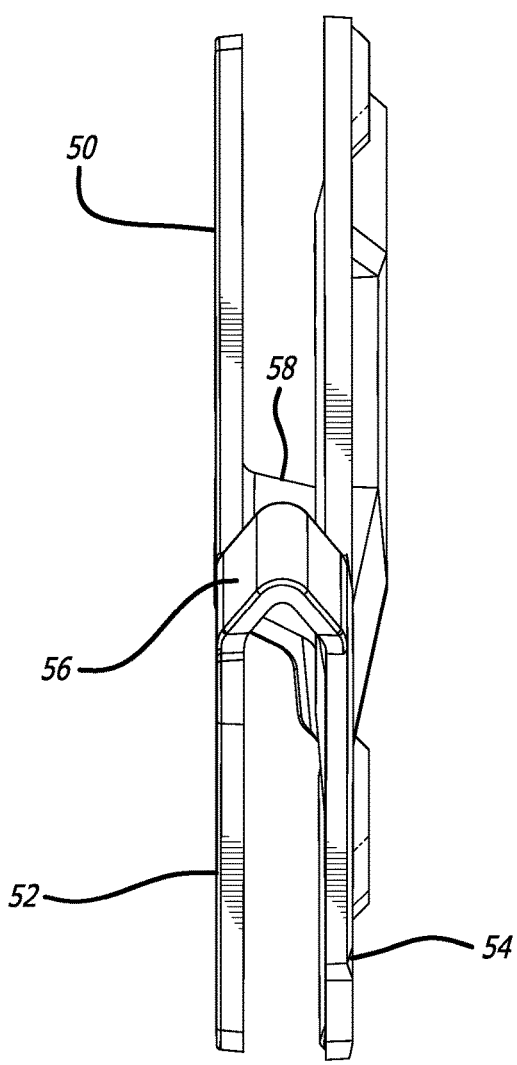
FIG. 8 is a top plan view of the one-piece chain cage of FIG. 6.
Figure 9:
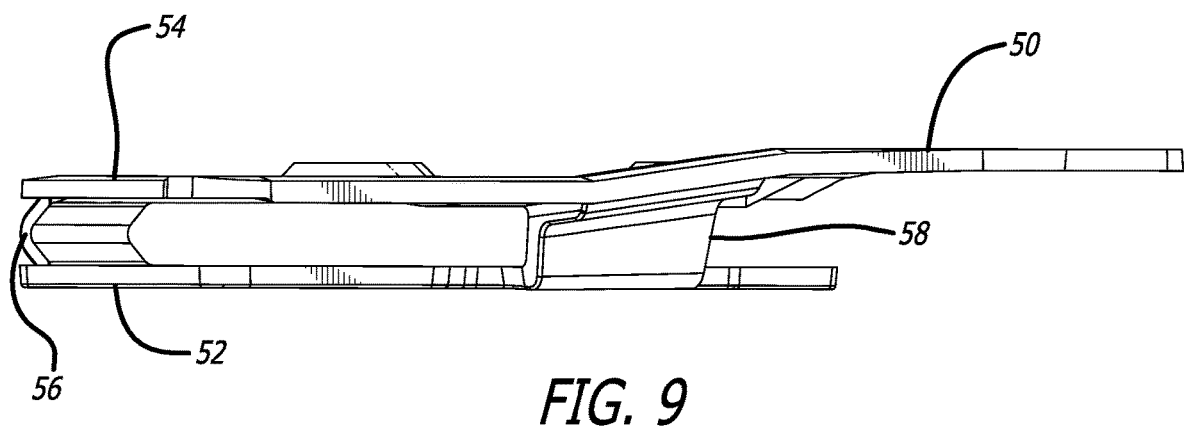
FIG. 9 is a bottom plan view of the one-piece chain cage of FIG. 6.

As shown in FIGS. 1-9 for purposes of illustration, an embodiment of the present invention resides in a rear derailleur assembly 20 that can be engaged to a frame 200 of a bicycle near a rear wheel (not shown) of the bicycle. A side of the rear derailleur assembly 20 facing the frame 200 may be referred to as an inward or inner side while an opposite side of the rear derailleur assembly 20 may be referred to as an outward or outer side. The rear derailleur assembly 20 is capable of moving a bicycle chain 210 laterally between gears (or sprockets or cogs) of a cassette 220 connected to the frame 200. The bicycle includes a control cable 230 extending between front and rear portions of the bicycle. The control cable 230 can be in the form of various cables including, without limitation, a Bowden-type control cable having an outer sheath and an inner wire. One end of the control cable 230 is connected to a shift control device (not shown) mounted on or near the bicycle's handlebar (not shown) at the front of the bicycle. The other end of the control cable 230 is connected to the rear derailleur assembly 20. As outlined above, tension on the control cable 230 affects movement of the bicycle chain 210 between gears (or sprockets or cogs) of the cassette 220 by controlling operation of the rear derailleur assembly 20. Various types of control cables 230 can be used including, without limitation, a Bowden-type control cable having an outer sheath and an inner wire.

The rear derailleur assembly 20 includes an upper body assembly 22 that acts as a base member by connecting the rear derailleur assembly 20 to a rear drop-out or rear axle holder (not shown) of the bicycle frame.

The rear derailleur assembly 20 also includes a chain cage assembly (or chain guide assembly) 24 that engages the bicycle chain 210 and moves the bicycle chain 210 from one gear of the cassette 220 to another gear of the cassette 220.

The rear derailleur assembly 20 further includes a controller assembly 26 operationally connecting the upper body assembly 22 to the chain cage assembly 24. As described in more detail below, movement of the controller assembly 26 causes movement of the chain cage assembly 24 which, in turn, moves the bicycle chain 210 between gears of the cassette 220. The inner wire of the control cable 230 enters one side of a receiving hole 42 in the upper body assembly 22, exits out the other side of the receiving hole 42, wraps around a pulley 44 (part of the upper body assembly 22), and is then anchored to an actuation arm 46 (part of the controller assembly 26).

The rear derailleur assembly 20 additionally includes a lower body assembly 28 that acts as a moveable member operationally connecting the controller assembly 26 to the chain cage assembly 24. The lower body assembly 28 also operationally connects the upper body assembly 22 to the chain cage assembly 24 due to the controller assembly 26 operationally connecting the upper body assembly 22 to the lower body assembly 28.

The upper body assembly 22 includes an upper body portion 30, a mounting bolt (or fixing bolt) 32 extending through a bore in the upper body portion 30 for threadedly securing the rear derailleur assembly 20 to the bicycle frame 200. Alternatively, the upper body portion 30 can include a cable stay member extending from the upper body portion 30 that is configured to provide support for the control cable 230. The cable stay member can include a cable guide bore through which the control cable 230 passes to be connected to the rear derailleur assembly 20.

The lower body assembly 28 includes a lower body portion (or movable member) 36 operationally connected to the chain cage assembly 24. The bodies of the upper and lower body assemblies 22, 28 may be made from various materials including, without limitation, a carbon fiber/nylon composite material; aluminum; plastic or the like.

As stated above, the controller assembly 26 operationally connects the chain cage assembly 24 to the upper body assembly 22. The controller assembly 26 includes a controller including an upper link arm (or upper pivot bar or inner pivot bar) and a lower link arm (or lower pivot bar or inner pivot bar) spaced apart from one another that acts as a linkage assembly for connecting the upper and lower body assemblies 22, 28. The upper link arm is pivotally connected at one end to the upper body portion 30, and the lower link arm is pivotally connected at one end to the upper body portion 30. The upper and lower body portions 30, 36 are part of the controller assembly 26. The upper link arm is pivotally connected to the lower body portion 36 at an end opposite the end pivotally connected to the upper body portion 30, and the lower link arm is pivotally connected to the lower body portion 36 at an end opposite the end pivotally connected to the upper body portion 30. The controller assembly 26 also includes a spring 34 operationally engaging the controller (i.e., the upper and lower link arms). The spring 34 is operationally connected to the upper and lower link arms in order to normally bias the upper and lower link arms in a first direction such that the lower body portion 36 is normally biased outwardly away from the bicycle frame 200 relative to the upper body portion 30 engaging the bicycle frame 200. In operation, the upper and lower link arms generally form a parallelogram with the upper and lower body portions 30, 36; the parallelogram rotating about the pivot connections of the upper and lower body portions as the spring 34 expands and contracts between strained and unstrained configurations. The spring 34 biases the chain cage assembly 24 to an innermost or outermost position relative to the gears of the cassette 220. A high limit adjustment screw (or outer limit screw) and a low limit adjustment screw (or lower limit screw) are used to adjust the range the parallelogram rotates about the pivot connections so that the chain cage assembly 24 will be positioned over no more than the highest gear and no less than the lowest gear. Turning the limit screws adjusts the limit of lateral travel of the pulleys of the chain cage assembly 24. Tightening the limit screws restricts the lateral travel, while loosening the limit screws allows more lateral travel. The purpose of the adjusting the limit screws is to find the tightest high limit screw setting that will allow a good shift to the outermost gear (i.e., the smallest in size) on the cassette 220, and the tightest lower limit screw setting that will allow a good shift to the innermost gear (i.e., the largest in size) on the cassette 220. The high limit screw is used to adjust the rear derailleur assembly 20 such that the upper pulley of the chain cage assembly 24 is centered with the center of the highest gear. An angle adjustment screw (or B-adjustment screw) is used to adjust the rear derailleur assembly 20 such that there are 5-7 mm in-between the top of the upper pulley 60 and the bottom of the lowest gear on the cassette 220.

The chain cage assembly 24 is attached to the lower body portion 36 of the assembly 20 and rotates about a pivot axis 100. The chain cage assembly (or chain guide assembly) 24 includes a one-piece chain cage 50 (also referred to as a derailleur cage or a chain guide) made from a single piece of material. The chain cage 50 may be made from various materials including, without limitation, forged carbon composite, aluminum, steel and the like. The chain cage 50 is of single-piece construction, and continuous along its perimeter. An advantage of this one-piece chain cage 50 is that the one-piece chain cage 50 uses fewer parts (i.e., because the chain cage 50 is a single component) as compared to conventional chain cages made from multiple components. The one-piece chain cage 50 is also lightweight and simple for manufacturing, reduces complexity, and adds to stiffness (which in turn provides crisp shifting with less latency) and durability.

The chain cage 50 has several different portions that include a pair of spaced apart, parallel cage layers (also referred to as inner and outer cage layers or inner and outer cage guides) 52, 54, and upper and lower bridges 56, 58 that "connect" the cage layers 52, 54. The chain cage 50 is one-piece. The one-piece chain cage 50 can be formed in a number of ways that result in a chain cage 50 that is one-piece without the use of mechanical fasteners. For example, the layers 52, 54 can each be cut from a separate sheet of material or from the same sheet of material (depending on the size of the sheet of material). The layers 52, 54 are then formed in a mold and fused together, along with the bridges 56, 58, so the chain cage 50 is one-piece. Several methods can be used to form the one-piece chain cage 50 where portions of the chain cage 50 start out as separate pieces that are then joined together. In the alternative, the cage layers 52, 54 and bridges 56, 58 are of a single-piece construction in that the entire chain cage 50 is formed from a single piece of material.

The bridges 56, 58 can be formed as separate parts that are fused together with the layers 52, 54. In the alternative, each layer 52 54 can be formed with one of the bridges 56, 58. Alternatively, one of the layers 52, 54 can be formed with both bridges 56, 58, and then formed with the other layer 52, 54. In the end, a one-piece or single-piece chain cage 50 formed from separate parts can be held together by the fusion of the individual pieces, and not by mechanical fasteners. When pieces (e.g., layers 52, 54 and bridges 56, 58) of a thermoplastic material are fused to form the one-piece chain cage 50, the thermoplastic material can be brought up to near the melting temperature of the thermoplastic material and then compressed together.

Each cage layer 52, 54 includes a number of cut-outs or apertures 48 (of various polygonal shapes and sizes) formed in the layers 52, 54 that provide weight reduction and add to the aesthetics of the chain cage 50. For example, the layer 54 includes an aperture 48 with a very large angle formed in the layers 52,54 that surrounds the aperture 48. This can give the appearance of an aperture 48 that is decreasing in size from one side of the layer 54 to the other side of the layer 54. Large chamfers can be formed into the sides of the layers 52, 54 of uniform thickness around the apertures 48, as well as the angles between the sides of each aperture 48, that add to stiffness. In another example, the layer 52 includes apertures 48 that are "straight-cut" or without chamfers through the layer 52 from one side of the layer 52 to the other side of the layer 52. The bridges 56, 58 act as stiffeners in a different way as the bridges 56, 58 add an inherent thickness to the chain cage 50 by connecting both layers 52, 54 together. The chain cage assembly 24 also includes a pair of pulleys (or sprockets or jockey wheels) that include an upper pulley (commonly known as the "guide pulley") 60 and a lower pulley (commonly known as the "jockey pulley," "tension pulley," or "idler pulley") 62. Each pulley 60, 62 is an idling gear cog that holds the bicycle chain 210 in a certain position. The upper pulley 60 is rotatably mounted on a first pivot shaft (not shown for clarity) between the layers 52, 54 at an upper end of the chain cage assembly 24. The first pivot shaft acts as an axle for the upper pulley 60, and can be in the form of the fastener (or pulley bolt) 72 used to connect the upper pulley 60 to the chain cage 50. The pulley bolt 72 is a bolt threaded into the layers 52, 54 through an aperture 76 extending through the layer 52, a central aperture 84 of the upper pulley 60, and an aperture 78 extending through the layer 54. The upper pulley 60 is closest to the gear cassette 220 and a certain distance away from the pivot axis 100. This certain distance is a function of the lower body portion position, the position of the pulley 60, and the pulley diameter, relative to the gear cassette 220. The upper pulley 60 moves the bicycle chain 210 onto the desired gear cog of the gear cassette 220. The lower pulley 62 is a distance away (this distance is a function of the chain slack that is needed to be taken up) from the pivot axis 100 that is larger than the distance from the center of the upper pulley 60 to the pivot axis 100. The chain cage assembly 24 operationally engages a torsion spring (or cage spring) 70 (seen in FIG. 3) that biases the chain cage assembly 24 against the lower body portion 36 of the assembly 20. The torsion spring 70 is part of the lower body assembly 28, and operates independent of a damper assembly (described below). The torsion spring 70 engages the outer layer 54 at the aperture 88. The lower pulley 62 is rotatably mounted on a second pivot shaft (not shown for clarity) between the layers 52, 54 of the chain cage 50 at a lower end of the chain cage 50. The second pivot shaft acts as an axle for the lower pulley 62, and can be in the form of the fastener (or pulley bolt) 74 used to connect the lower pulley 62 to the chain cage 50. The pulley bolt 74 is a bolt threaded into the layers 52, 54 through an aperture 80 extending through the layer 52, a central aperture 86 of the lower pulley 62, and an aperture (not shown) extending through the layer 54. Each pulley bolt 72, 74 clamps a bearing that is inside the particular pulley 60, 62 that a particular pulley bolt 72, 74 is associated with. The upper and lower pulleys 60, 62 may include sealed precision pulley bearings to reduce friction and avoid contamination.

The lower body portion 36 is rotatably secured to the chain cage 50 at the outer layer 54 (i.e., the cage layer closest to lower body portion 36), with the entire cage assembly 24 having limited rotation about the pivot axis 100 relative to the lower body portion 36 (a stop 40 on the chain cage 50 limits the rotation of the chain cage 50 about the pivot axis 100). A threaded fastener 92 extends through a shaft 94 extending through the layer 54, and engages the lower body portion 36. The threaded fastener and the shaft 94 are co-axial with the pivot axis 100. The chain cage assembly 24 is spring-loaded about the pivot axis 100 in one direction of rotation, and there is a limited range of rotation between the chain cage assembly 24 and the lower body portion 36.

The one-piece chain cage 50 can be made of various materials using various processes/methods. For example, the one-piece chain cage 50 can be made using a thermoplastic composite process (thermoforming) that includes cutting of blanks from pre-pregs (a pre-preg being a composite material made from "pre-impregnated" fibers and a partially cured polymer matrix, such as epoxy or phenolic resin, or even thermoplastic mixed with liquid rubbers or resins); thermoforming of blanks; blanks placement and build-up of a pre-form; pressing of the pre-form in a tool (e.g., a mold); and machining of apertures and/or holes in the pre-form and/or adding threads to apertures and/or holes (this can also be done with tooling inserts). For example, the chain cage 50 can be made of thermoplastic carbon using a forging/compression tool. In the alternative, the chain cage 50 can be made from forged aluminum or steel. In another alternative, the chain cage 50 can be made from plastic using injection molding.

For the thermoplastic composite process, the carbon pre-preg sheets are cut into patterns that are then placed into a male/female mold. In the mold, slides can be used to create the hollow sections (i.e., the spaces between the two layers 52, 54). Pressure and heat are then added. A difference between this process and traditional thermoset carbon composite method is that the pre-preg sheets of this process are not tacky. That is, the pre-preg sheets are dry and have been cut exactly as needed. Furthermore, curing in this process takes about ten (10) minutes and not the half a day or several hours required in the traditional thermoset carbon composite method. No sanding is required in the process. Repeatability is good (in that there is a low manufacturing rejection rate), and the products can be recycled (e.g., excess material left over when trimming the sheets or even in the post-processes can be collected, melted down, and formed into new sheets). The same general process can be used when seeking to forge the one-piece chain cage 50 from steel or aluminum, but with different pressures, temperatures and materials. The foregoing techniques can also allow each layer 52, 54 of the chain cage 50 to be made with hollows inside the layers 52, 54 (i.e., each layer 52, 54 can include at least one hollow or void in the center of the layer 52, 54 to make the layer 52, 54 lighter but just as strong). Each of the bridges 56, 58 can also include at least one hollow inside the bridge. The result is a one-piece chain cage 50 that is simpler, lighter, tougher etc. than conventional multi-piece chain cages held together by fasteners.

The chain cage assembly 24 serves three functions. A first function is to "take up" extra slack on the bicycle chain 210 when the bicycle drivetrain is in a higher gear. A second function is to maintain tension on the bicycle chain 210 so that the bicycle chain 210 securely wraps around the two gear cogs (e.g., a gear cog in front commonly known as the "chain ring" and a gear cog in the rear that is commonly part of the cassette 220 (with the cassette 220 including a plurality of gear cogs)) which are providing the drive to the bicycle. The third function is to provide the position of the bicycle chain 210 (via the derailleur lower body 28), to whichever gear on the cassette 220 the user selects when shifting between gears of the cassette 220.

To expand on the first function of the chain cage assembly 24, it is important to understand why slack on the bicycle chain 210 needs to be "taken up." The principle of the drivetrain of a bicycle is to provide power from the crank arms (i.e., the levers to that bicycle pedals are attached to) to the rear wheel of the bicycle. This is done by using two gear cogs (connected via the bicycle chain 210). The cassette 220 has multiple gear cogs to provide different gear ratios. The rear derailleur assembly 20 provides the operation of moving the bicycle chain 210 in order to change from one gear on the cassette 220 to another gear on the cassette 220, and effectively change the gear ratio. In operation, the user changes which gear cog on the cassette 220 the bicycle chain 210 is on using the rear derailleur assembly 20 depending on what gear ratio the user desires. In this scenario, the chain ring (i.e., the gear cog in front) does not change its diameter. However, the diameter of the rear gear cog on the cassette 220 is "changed" through the selection of a new gear on the cassette 220 having a different diameter and moving the bicycle chain 210 to the new gear cog on the cassette 220. The bicycle chain 210 wraps around both gear cogs (i.e., the gear cogs in front and rear) plus the length required to travel along the "chain stays" (i.e., the horizontal bars that connect the bottom bracket (where the crank sits) to the seat stays (i.e., the angles tubes that run up to the seat post) of the bicycle frame). However, the length of the bicycle chain 210 is unable to be changed when the diameter of the rear gear cog is "changed" by switching to a new rear gear cog of the cassette 220. Since the length of the bicycle chain 210 cannot be changed, the bicycle chain 210 is designed to have extra length when installed on the bicycle, and the excess length (or chain slack) is "taken up" via the chain cage assembly 24.

The second function of the chain cage assembly 24 is important for performance. In order for a gear and chain drivetrain to work properly, the drivetrain needs to have a certain amount of back tension on the bicycle chain 210. If not, there is a possibility that the bicycle chain 210 will not properly engage the front and rear gear cogs (i.e., will not properly engage the teeth of the gear cogs).

It is important that the chain cage 50 is stiff as any flex of the chain cage 50 will provide poor shifting performance. The lower body portion 36 engages the chain cage assembly 24 which then engages the bicycle chain 210 to select a new gear on the gear cassette 220. If the cage flexes, the guide pulley does not offer instant positioning of the chain and the "shift time" is reduced.

The assembly 20 may also include a damper assembly such that the chain cage (chain guide) does not rotate beyond a reasonable amount in certain rough conditions. A reasonable amount is defined as the point where the bicycle chain will not become unseated from the pulleys (cogs). When the bicycle chain becomes unseated from the pulleys (cogs), the bicycle chain can "derail," making the drive system inoperable. To maintain a reasonable amount of chain guide rotation, the assembly 20 can include a damper assembly. The damper assembly includes an input shaft connected to the chain cage, a one-way bearing, a bearing housing, one or more friction discs, one or more intermediate discs, a pressure plate, a single or series of springs that apply an axial force and a clamp bolt. The damper assembly is coupled to both the movable member and the chain cage. The damper assembly functions in a way that controls movement of the chain cage back and forth between the direction of chain tensioning and in the opposite direction.

In use, the control cable 230 for actuating the rear derailleur assembly 20 is secured to the controller assembly 26. Tension on the control cable causes relative movement between the upper body portion 30 and the lower body portion 36, moving the upper and lower link arms in a second direction opposite the first direction where the lower body portion 36 and the chain cage assembly 24 are normally biased outwardly away from the bicycle frame 200, and moving the lower body portion 36 and the chain cage assembly 24 laterally towards the bicycle frame 200. As stated above, the amount of tension on the control cable 230 determines which direction the bicycle chain 210 will move in (i.e., from lower gear to higher gear or from higher gear to lower gear). The shift control device (not shown) allows the rider of the bicycle to pull (increase tension) or release (decrease tension) the control cable 230. With the control cable 230 (e.g., an inner wire if the control cable is a Bowden-type cable), the chain cage assembly 24 can be moved laterally by moving the controller assembly 26 via the amount of tension on the inner wire. One end of the inner wire is connected the controller assembly 26 by a cable anchor bolt, and the other end of the inner wire is connected to the shift control device mounted on the bicycle handlebar. When the shift control device is operated by the rider, tension on the inner wire of the control cable 230 is pulled or released. Pulling the inner wire (i.e., increasing tension on the inner wire) of the control cable 230 moves the chain cage assembly 24 against the biasing force of the spring 34, while releasing the inner wire (i.e., decreasing tension on the inner wire) causes the chain cage assembly 24 to move due to the biasing force of the spring 34. Increasing tension on the control cable 230 causes the chain cage assembly 24 to move in one direction (which, in turn, moves the bicycle chain in that same direction), while releasing tension on the control cable 230 causes the chain cage assembly 24 to move in another direction (generally the opposite direction the chain cage assembly 24 moves in when tension is increased). Thus, the chain cage assembly 24 (along with the bicycle chain) can be moved laterally by increasing or decreasing tension on the control cable 230. When the control cable 230 is pulled (i.e., tension increased), the upper and lower link arms pivot inwardly against the force of the spring 34 so as to move the chain cage assembly 24 inwardly towards the bicycle which, in turn, moves the bicycle chain 210 from one gear to another on the cassette 220. When the control cable 230 is released (i.e., tension decreased), the upper and lower link arms pivot outwardly, pulled by the force of the spring 34, so as to move the chain cage assembly 24 outwardly away from the bicycle which, in turn, moves the bicycle chain 210 from one gear to another on the cassette 220.

In the alternative, the rear derailleur assembly may be an electric derailleur that does not use a mechanical cable (housing included (e.g., a Bowden-type control cable)), cable stay, or high-force parallelogram spring to control movement of the chain cage assembly 24. Instead, an electro-mechanical derailleur utilizes an electric motor (the electric motor may or may not be connected to a reduction gearbox) that, when given power, moves the chain cage assembly 24 into a new gear position. Similarly, the mechanical shifting mechanism (or shifter) is also replaced with an electronic version that has a series of buttons that allow the user to control movement of the chain cage assembly 24. Furthermore, an electro-mechanical derailleur can be either what is called wired or wireless. For example, a wired electro-mechanical derailleur works in conjunction with an electronic shifting mechanism (or shifter) that sends a signal to the rear derailleur assembly through a set of wires electro-mechanically interconnecting the shifter and rear derailleur assembly. The signals from the shifter communicate a gear shift to the rear derailleur assembly. A wireless electromechanical shifter is a shifter that sends a signal through a wireless protocol to the rear derailleur to shift the gear. The shifter and derailleur are able to send/receive wireless signals from one another. There is also a battery or other power source that will either be attached to the rear derailleur assembly, the shifter, or mounted to the bicycle frame.

To maintain a reasonable amount of rotation of the chain cage assembly 24 relative to the lower body portion 36, the assembly 20 includes a one-way damper assembly (clutch assembly, damping assembly, dampening assembly, dampening mechanism, or damping arrangement) for pivotal movement of the chain cage assembly 24 that creates friction to slow or reduce rotation speed of the chain cage assembly 24 around the pivot axis in an opposite direction of rotation from the direction of rotation provided by the force of the spring-load. A "reasonable amount" is defined as the point where the bicycle chain 210 will not become unseated from the pulleys of the chain cage assembly 24. The damper assembly is located in a knuckle of the lower body portion 36. In this manner, the one-way damper assembly (not shown) provides rotational resistance to pivotal movement of the chain cage assembly 24 caused by, for example, the bicycle hitting a bump on the surface the bicycle is riding over. The damper assembly reduces angular acceleration in the direction the bicycle chain 210 is pulling as the chain cage assembly 24 moves forward and the damper assembly 50 provides no resistance as the chain cage assembly 24 travels back. Thus, in the direction of rotation provided by the spring-load, there is no damping provided by the damper assembly. The damper assembly includes a chain guide spring that, via the chain cage assembly 24, applies a sufficient tension to the bicycle chain 210. The damper assembly includes a central shaft (central axle) or input shaft (the pivot axis runs through a central longitudinal axis of the input shaft and, by extension, the damper assembly).

The chain guide spring (e.g., torsion spring 70) is loaded to bias the chain cage assembly 24 in one direction. A stop 40 extending outward from the chain cage assembly 24 prevents the chain cage assembly 24 from rotating past a certain point in the direction of rotational bias imparted by the chain guide spring when the stop 40 engages the lower body portion 36, preventing further rotational movement of the chain cage assembly 24 relative to the lower body portion 36. The stop 40 engages the layer 54 through a threaded aperture 90. The chain guide spring biases the chain cage assembly 24 in a chain tensioning direction around the damper assembly operationally engaging the chain cage assembly 24 via the input shaft operationally engaging the chain cage assembly 24. The input shaft itself rotate within the bore in the same direction as the chain cage assembly 24 is rotating. The damper assembly is housed in the bore of the knuckle of the lower body portion 36 so that the chain cage assembly 24 can apply a sufficient tension to the bicycle chain. A cap engages the lower body portion 36 (e.g., the cap may be bolted to the lower body portion 36) and covers the opening to the bore of the knuckle.

While the user shifts to a lower gear, the rear derailleur moves, but the chain guide assembly 24 stays in an initial position until the bicycle chain 210 catches and changes gear. The chain guide assembly 24 rotates about the pivot axis 100 as a gear changes.

An aperture 96 on the outer layer 54 is used to keep the chain cage 50 from rotating during installation.

In addition, the claimed invention is not limited in size and may be constructed in various sizes in which the same or similar principles of operation as described above would apply. Furthermore, the figures (and various components shown therein) of the specification are not to be construed as drawn to scale.

The terminology used herein is for the purpose of describing particular example embodiments only and is not intended to be limiting. As used herein, the singular forms "a", "an" and "the" may be intended to include the plural forms as well, unless the context clearly indicates otherwise. In other words, an element or step recited in the singular and preceded by the word "a" or "an" should be understood as not necessarily excluding the plural of the elements or steps. Further, references to "one embodiment" or "one implementation" are not intended to be interpreted as excluding the existence of additional embodiments or implementations that also incorporate the recited features.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps. In other words, unless explicitly stated to the contrary, embodiments "comprising" or "having" an element or a plurality of elements having a particular property can include additional elements not having that property. In other words, the terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. In other words, the use of "including," "comprising," "having," "containing," "involving," and variations thereof, is meant to encompass the items listed thereafter and additional items. Further, references to "one embodiment" or "one implementation" are not intended to be interpreted as excluding the existence of additional embodiments or implementations that also incorporate the recited features. The term "exemplary" is intended to mean "an example of".

When introducing elements of aspects of the disclosure or the examples thereof, the articles "a," "an," "the," and "said" are intended to mean that there are one or more of the elements. In other words, the indefinite articles "a", "an", "the", and "said" as used in the specification and in the claims, unless clearly indicated to the contrary, should be understood to mean "at least one." The use of the expression "at least" or "at least one" suggests the use of one or more elements or ingredients or quantities, as the use may be in the embodiment of the disclosure to achieve one or more of the desired objects or results.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary. Any range or value given herein can be extended or altered without losing the effect sought, as will be apparent to the skilled person.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

While various spatial and directional terms, such as "top," "bottom," "upper," "lower," "vertical," and the like are used to describe embodiments and implementations of the present disclosure, it is understood that such terms are merely used with respect to the orientations shown in the drawings. The orientations can be inverted, rotated, or otherwise changed, such that a top side becomes a bottom side if the structure is flipped 180 degrees, becomes a left side or a right side if the structure is pivoted 90°, and the like. In other words, spatially relative terms, such as "front," "rear," "left," "right," "inner," "outer," "beneath", "below", "lower", "above", "upper", "horizontal", "vertical", "lateral", "longitudinal" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above can relate to one embodiment or can relate to several embodiments. The embodiments are not limited to those that solve any or all of the stated problems or those that have any or all of the stated benefits and advantages. It will further be understood that reference to 'an' item refers to one or more of those items.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing a particular operation before, contemporaneously with, or after another operation (e.g., different steps, etc.) is within the scope of aspects and implementations of the disclosure. In other words, the method steps, processes, and operations described herein are not to be construed as necessarily requiring their performance in the particular order discussed or illustrated, unless specifically identified as an order of performance. It is also to be understood that additional or alternative steps may be employed.

The phrase "one or more of the following: A, B, and C" means "at least one of A and/or at least one of B and/or at least one of C." The phrase "and/or", as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of" only one of or "exactly one of." "Consisting essentially of," when used in the claims, shall have its ordinary meaning as used in the field of patent law.

As briefly discussed above, as used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are example embodiments. Many other embodiments will be apparent to those of ordinary skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person of ordinary skill in the art to practice the various embodiments of the disclosure, including making and using any devices or systems and performing any incorporated methods. The patentable scope of the various embodiments of the disclosure is defined by the claims, and can include other examples that occur to those persons of ordinary skill in the art. Such other examples are intended to be within the scope of the claims if the examples have structural elements that do not differ from the literal language of the claims, or if the examples include equivalent structural elements with insubstantial differences from the literal language of the claims.

The above description presents the best mode contemplated for carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above that are fully equivalent. Moreover, features described in connection with one embodiment of the invention may be used in conjunction with other embodiments, even if not explicitly stated above. Consequently, this invention is not limited to the particular embodiments disclosed. On the contrary, this invention covers all modifications and alternate constructions coming within the spirit and scope of the invention as generally expressed by the following claims, which particularly point out and distinctly claim the subject matter of the invention.

What is claimed is:

1. A rear derailleur assembly for mounting to a bicycle, wherein the bicycle includes a frame, comprising:
    an upper body portion configured to operationally engage the rear derailleur assembly to the frame;
    a controller portion pivotally connected to the upper body;
    a lower body portion pivotally connected to the upper body and pivotally connected to the controller portion; and
    a chain cage assembly;
    wherein the chain cage assembly includes at least two pulleys configured to engage a chain of the bicycle, and a one-piece chain cage configured to retain each pulley at a particular fixed position;
    wherein each pulley is rotatable relative to the one-piece chain cage at the particular fixed position of the pulley; and
    wherein the lower body portion is operationally connected to the one-piece chain cage and configured to allow the one-piece chain cage to pivot relative to the lower body portion; and wherein the one-piece chain cage includes at least one hollow.

2. The rear derailleur assembly of claim 1, wherein the one-piece chain cage comprises a pair of spaced apart, parallel cage layers connected by at least one bridge.

3. The rear derailleur assembly of claim 2, wherein the cage layers and bridge are of single-piece construction.

4. The rear derailleur assembly of claim 2, wherein each cage layer includes a number of apertures.

5. The rear derailleur assembly of claim 1, wherein the one-piece chain cage is formed from a thermoplastic composite material.

6. The rear derailleur assembly of claim 2, wherein each cage layer includes at least one hollow in the cage layer.

7. A chain cage assembly for a rear derailleur of a bicycle having a frame and a chain, comprising:
    at least two pulleys configured to engage the chain of the bicycle; and
    a one-piece chain cage configured to retain each pulley at a particular fixed position;

wherein each pulley is rotatable relative to the one-piece chain cage at the particular fixed position of the pulley; and wherein the one-piece chain cage includes at least one hollow.

8. The chain cage assembly of claim 7, wherein the one-piece chain cage comprises a pair of spaced apart, parallel cage layers connected by at least one bridge.

9. The chain cage assembly of claim 8, wherein the cage layers and bridge are of single-piece construction.

10. The chain cage assembly of claim 8, wherein each cage layer includes a number of apertures.

11. The chain cage assembly of claim 7, wherein the one-piece chain cage is formed from a thermoplastic composite material.

12. The chain cage assembly of claim 8, wherein each cage layer includes at least one hollow in the cage layer.

13. A chain cage for a rear derailleur of a bicycle having a frame and a chain, comprising:
a one-piece chain cage including at least one hollow.

14. The chain cage of claim 13, wherein the one-piece chain cage comprises a pair of spaced apart, parallel cage layers connected by at least one bridge.

15. The chain cage of claim 14, wherein the cage layers and bridge are of single-piece construction.

16. The chain cage of claim 14, wherein each cage layer includes a number of apertures.

17. The chain cage of claim 13, wherein the one-piece chain cage is formed from a thermoplastic composite material.

18. The chain cage of claim 14, wherein each cage layer includes at least one hollow in the cage layer.

* * * * *